United States Patent [19]
McCoy et al.

[11] Patent Number: 5,249,823
[45] Date of Patent: Oct. 5, 1993

[54] SIZE VARIABLE CART

[75] Inventors: Stephen T. McCoy, Missouri City; Jack G. Clark, Jr., Houston, both of Tex.

[73] Assignee: E.B.S. Equipment Services, Inc., Houston, Tex.

[21] Appl. No.: 958,740

[22] Filed: Oct. 9, 1992

[51] Int. Cl.⁵ ............................................. B62B 3/02
[52] U.S. Cl. ..................................... 280/656; 280/35; 280/47.34; 280/87.01; 280/144
[58] Field of Search .............. 280/35, 47.34, 47.371, 280/87.01, 144, 147, 148, 651, 659, 656

[56] References Cited

U.S. PATENT DOCUMENTS

| | | | |
|---|---|---|---|
| 1,112,963 | 10/1914 | Alexander | 280/35 |
| 1,478,537 | 12/1923 | Shelby | 280/144 |
| 1,560,164 | 11/1925 | Jarnagin | 280/651 X |
| 2,420,847 | 5/1947 | Trabucco | 280/87.01 |
| 2,469,242 | 5/1949 | Pohl . | |
| 2,480,025 | 8/1949 | Hunter | 280/35 |
| 2,885,090 | 5/1959 | Forman et al. | 280/35 X |
| 3,278,042 | 10/1966 | Frydenberg | 280/35 X |
| 3,887,093 | 6/1975 | Howell | 280/144 X |
| 4,114,914 | 9/1978 | Cohen | 280/30 |
| 4,354,689 | 10/1982 | Perego | 280/47.371 |
| 4,744,575 | 5/1988 | Tonelli | 280/87.01 |
| 4,796,909 | 1/1989 | Kirkendall | 280/651 |
| 4,887,836 | 12/1989 | Simjian | 280/651 |
| 4,984,814 | 1/1991 | Graffunder | 280/35 |

FOREIGN PATENT DOCUMENTS 539172  4/1957  Canada .................................. 280/35

Primary Examiner—Brian Johnson
Attorney, Agent, or Firm—Litman, McMahon & Brown

[57] ABSTRACT

A cart comprises a load carrying bed, a front wheel carriage, a rear wheel carriage and a handle. The bed telescopes longitudinally to allow for loads of different lengths which are positionable directly upon the bed. A pair of front side arms and a pair of rear side arms are also telescopingly received relative to the bed and are adjustable laterally to provide for loads having different widths. The cart is collapsible into a low profile configuration for transport or storage.

18 Claims, 3 Drawing Sheets

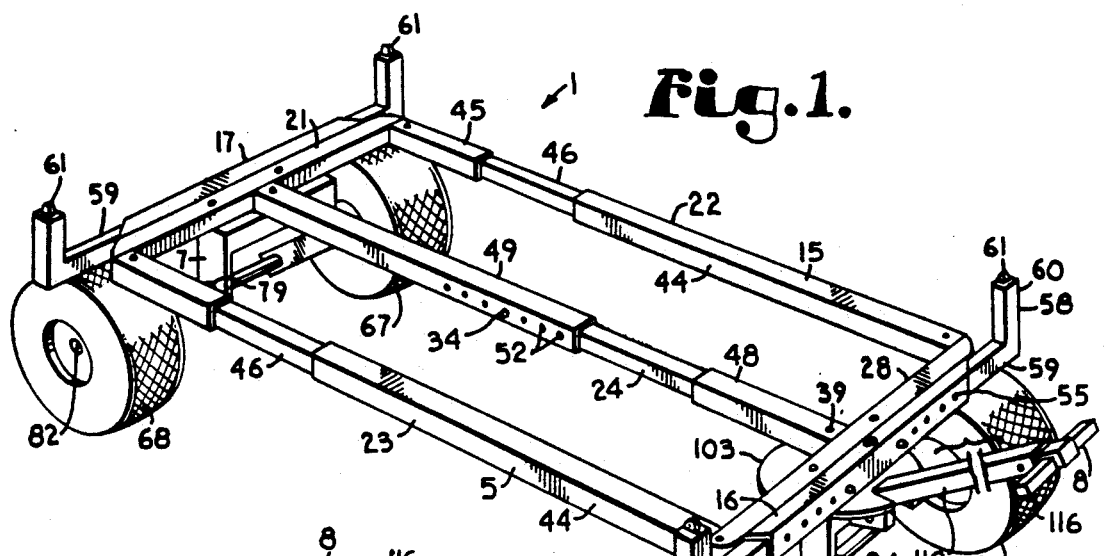

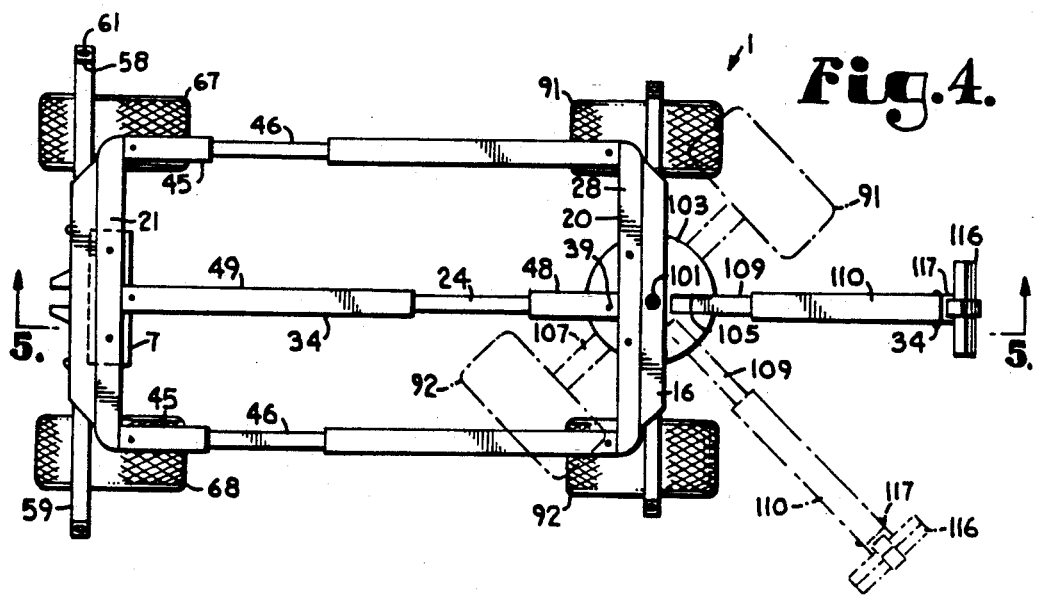
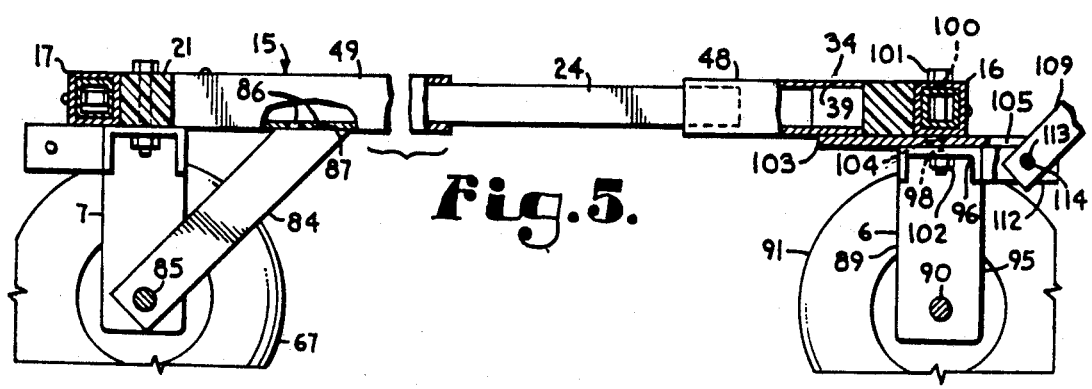
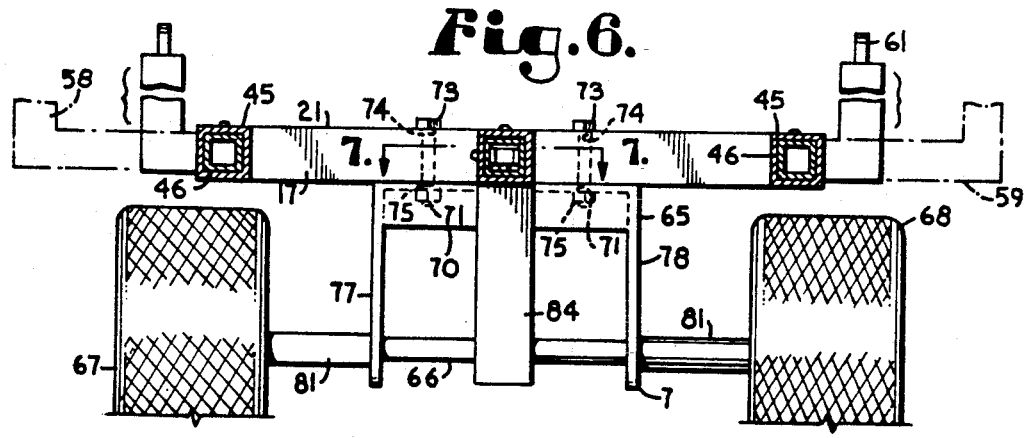
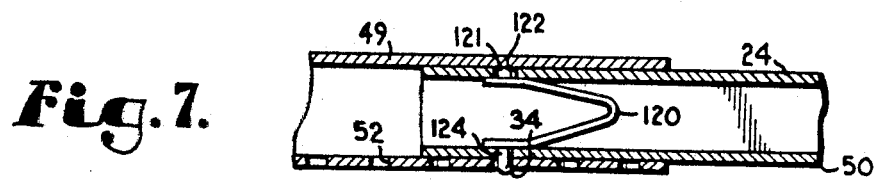

SIZE VARIABLE CART

BACKGROUND OF THE INVENTION

The present invention is directed to a cart wherein both the length and width can be readily modified to fit a wide variety of loads.

Each year manufacturers are producing a widening variety of products which are designed to be carried to various events or work. Such products include ice chests, cages for carrying animals to dog and cat shows and the like. Each year the available sizes and shapes of such products also increases. For example, ice chests which originally were fairly small containers are ever increasing in size to handle larger loads. Such chests must often be transported to sporting events, the beach or other locations that are significantly removed from the area wherein transportation can be parked. Consequently, these chests and similar products must be carried a significant distance, often over soft ground, loose dirt or sand.

While the number of these products have been steadily increasing, the number of persons who suffer from some form of injury that hinders their ability to carry objects, usually a back injury, have also been increasing. As the products get larger, many people simply cannot carry them for any great distance and those suffering from injury can carry them for virtually no distance. Consequently, it is desirable to have a cart which can be easily modified to fit various shaped products to transport the products from vehicles or the like to the site where the products will be utilized. Likewise, it is useful around home or office to have a cart that can be easily adapted to different size loads to carry loads such as trash receptacles to the curbing, fireplace logs, boxes from one location to another or the like.

While a single large cart might serve all of these purposes and be usable for the function of carrying many objects, such carts are often not acceptable because they are fairly bulky and take up a great deal of space and may weigh too much for the average person to load into a vehicle. Consequently, it is desirable to have a cart which is lightweight and readily modified to various size loads and which can be likewise quickly collapsed to a relatively small profile for storing or carrying next to other objects in a vehicle or the like. Furthermore, it is desirable that the cart be light weight and have relatively wide wheels to allow the cart to be utilized over soft or muddy ground or sand as well as stability when turning.

SUMMARY OF THE INVENTION

The present invention is directed to a cart that can be easily and quickly adapted to support loads having various sizes and shapes by both lateral and longitudinal modification of dimensions of the cart. The cart includes a bed which telescopes longitudinally and has a relatively planer upper surface associated with the bed. The cart also includes a front and rear wheel carriage for positioning beneath the bed such that the wheels are beneath the plane of the upper surface of the bed. The cart also includes lateral side arms which may be selectively adjusted laterally so as to provide for loads having different widths. The cart further includes a handle attached to the front wheel carriage which is rotatable about a vertical axis relative to the bed so that a user of the cart can pull and control the direction of travel of the cart.

The cart further includes positioning means which allow selected longitudinal and lateral configurations of the various members of the cart to be held in such a selected configuration until it is desired by user to modify the cart to a different configuration. In particular, both the lateral side arms telescope relative to the bed and the main longitudinal members of the bed telescope to allow adjustment thereof and the arms and members are held in place by spring biased pins passing through apertures positioned at selected intervals along the arms and members.

The bed of the cart has a rather low profile, especially when entirely compressed and allows direct positioning of loads upon the bed, especially loads that are elongate in nature and placed laterally upon the bed so as to straddle a pair of longitudinal members. Where loads are not of such a size or nature as to allow placement directly upon the bed, since to do so would allow the load to fall through the bed, a load carrying tray is provided for the cart. The tray sits directly on the bed and allows the transport of granular type materials or other types of materials that would not otherwise fit directly on the bed. The tray is preferably recessed at the corners to mate with upright portions of the arms which hold the tray in place on the bed. Likewise, a planar sheet of plastic or other material may be first positioned on the bed to support certain types of loads to prevent the load from falling through the bed members.

OBJECTS AND ADVANTAGES OF THE INVENTION

Therefore, the objects of the present invention are: to provide a cart which is easily and quickly modified to various sizes so as to provide a relatively small profile for storage and carrying when in the smallest configuration and yet be adaptable to provide support for a wide variety of loads having both different lengths and widths; to provide such a cart having telescoping elongate frame members which are capable of directly supporting a load while maintaining structural weight at a minimum; to provide such a cart that is expandable both in length and in width through use of telescoping members; to provide such a cart which is constructed of lightweight materials and which utilizes frame members for directly supporting loads so as to provide an overall lightweight and compact construction; to provide such a cart having relatively wide wheels which improve use of the cart in mud, soft ground and sand; to provide such a cart which can be easily converted by addition of a planar sheet or sided tray to allow carrying of granular materials such as dirt or sand, as well as other small objects; to provide such a cart having most parts thereof connected by a snap connect construction so as to be easily and quickly constructed or modified; and to provide such a cart which is relatively inexpensive to build, easy to manufacture and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present

3 invention and illustrate various objects and features thereof.

BRIEF DESCRIPTION OF THE DRAWINGS

FIG. 1 is a perspective view of a cart in accordance with the present invention.

FIG. 2 is a front elevational view of the cart on a reduced scale, illustrating lateral support arms thereof in a first unexpanded configuration in solid lines and in a partially expanded second configuration in phantom lines.

FIG. 3 is a top plan view of the cart on a reduced scale, illustrating the cart in the unexpanded configuration and showing the lateral support arms in a partially expanded configuration in phantom lines.

FIG. 4 is a top plan view of the cart on a reduced scale, illustrating the cart partially expanded both laterally and longitudinally, and further illustrating front wheels and handle of the cart in solid lines in a configuration to proceed straight ahead and in phantom lines in a configuration to turn to the right.

FIG. 5 is an enlarged and fragmentary cross sectional view of the cart, taken along line 5—5 of FIG. 4.

FIG. 6 is an enlarged and fragmentary cross sectional view of the cart, taken along line 6—6 of FIG. 3.

FIG. 7 is an enlarged and fragmentary cross sectional view of a central longitudinally telescoping frame member of the cart, taken along line 7—7 of FIG. 6.

FIG. 8 is an enlarged side view of a lateral support arm of the cart.

DETAILED DESCRIPTION OF THE INVENTION

Figure 10:
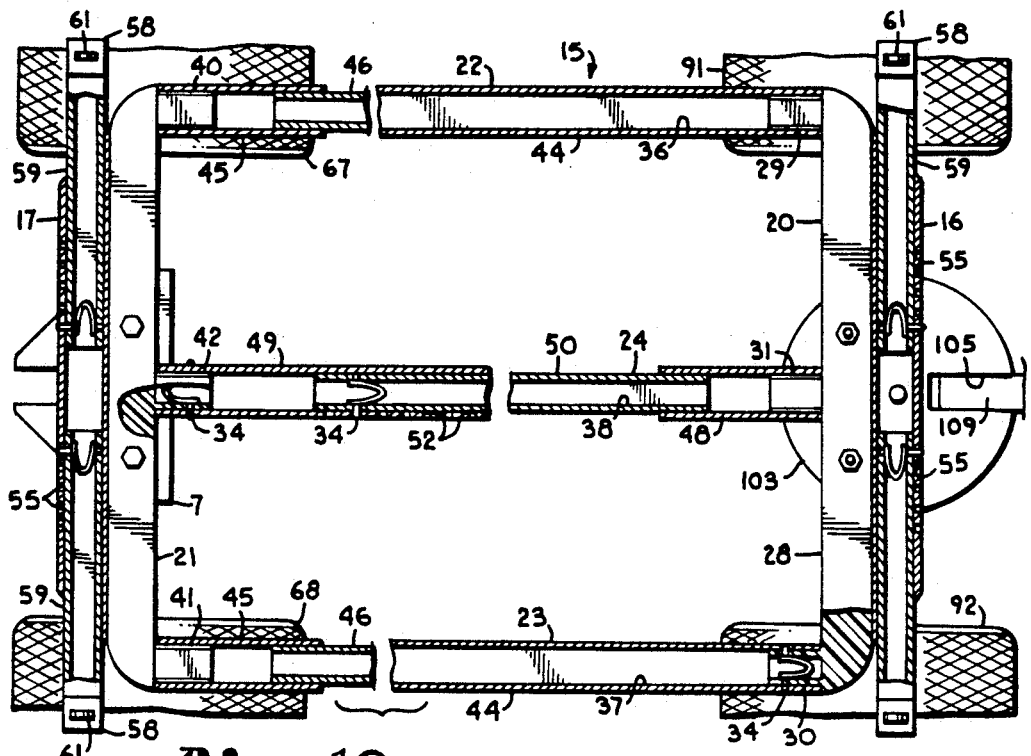
FIG. 10 is an enlarged and fragmentary top plan view of the cart, with portions broken away to illustrate the telescoping nature of various longitudinal frame members and lateral side arms thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a cart in accordance with the present invention. The cart 1 comprises a telescoping frame 5 supported by a pivotal front carriage 6, a rear carriage 7 and a draw handle 8.

The telescoping frame 5 includes a rectangularly shaped load receiving bed 15 having at front and rear ends thereof front and rear lateral support arm carriers 16 and 17.

The load receiving bed 15 includes a front, laterally extending member 20 a rear laterally extending member 21 connected by a pair of lengthwise or longitudinally extending side members 22 and 23 and a longitudinally extending central member 24 intermediately positioned between the side members 22 and 23.

As can best be seen in FIG. 10, the front laterally extending member 20 includes an elongate bar 28 having stubs extending rearwardly thereon in the form of a trident and, in particular, having side stubs 29 and 30 and central stub 31. The stubs 29, 30 and 31 are square or rectangular in cross-section and are hollow. Inserted in each of the stubs 29, 30 and 31 is a spring biased pin 34, such as are used throughout the cart 1 and which will be described in greater detail below.

The forward end of each of the longitudinally extending side members 22 and 23 and the longitudinally extending central member 24 are square or rectangularly tubed shaped and have a central cavity 36, 37 and 38 respectively which are slidingly but snugly received over the stubs 29, 30 and 31 respectively. An aperture 39 is located in the forward end of each of the longitudinally extending side members and central member, 22, 23 and 24 and when the longitudinally extending side members and central member 22, 23 and 24 are placed over the stubs 29, 30 and 31 the pins 34 are held in the interiors of such stubs, until the members 22, 23 and 24 are entirely covering the stubs 29, 30 and 31, respectively at which time the pins 34 are urged into the apertures 39 to thereby secure the members 22, 23 and 24 to the laterally extending member 20. For disassembly the reverse can be accomplished by a hard axial pull toward the rear with application of pressure to the pin 34 to dislodge the pin 34 from an associated aperture 39.

The rear laterally extending member 21 is essentially a mirror image of the front laterally extending member 20, having stubs 40, 41 and 42 snugly receiving the longitudinally extending side members and central member 22, 23 and 24, respectively and held in place by pins 34.

Both of the longitudinally extending side members 22 and 23 have elongate front sections 44, rear sections 45 and intermediate sliding sections 46. The sliding sections 46 are arranged so as to be sleeved at opposite ends thereof by the front and rear sections 44 and 45. The sliding sections 46 are each fixed in position relative to the rear sections 45 and slide forwardly and rearwardly with respect to the front sections 44 within which they telescope.

The longitudinally extending central member 24 includes a front section 48, a rear section 49 and an intermediate section 50. The rear section 49 is somewhat longer than the front section 48 and includes therealong a series of longitudinally spaced apertures 52. The intermediate section 50 is inserted in both the front and rear sections 48 and 49 so as to be sleeved at opposite ends thereof by the sections 48 and 49. The intermediate section 50 is also fixed as by gluing or the like to maintain a fixed relationship relative to section 48, but telescopes with respect to section 49.

The intermediate section 50 includes a spring biased pin 34 which is positioned to be received within the apertures 52 one at a time as the intermediate section 50 telescopes relative to the rear section 49. In this manner the pin 34 is biased into the apertures 52 to act as position retention nears to substantially secure a specific length for the longitudinally extending central member 24 and consequently for the length of the bed 15.

The pin 34 can be overcome by axial pressure exerted along the intermediate section 50 and, if necessary, by depressing the pin 34 to provide for modification of the length of the longitudinally extending central member 24.

The cart 1 can be seen in one of a multitude of extended configurations in FIG. 4 and in an unextended or compressed configuration in FIG. 3 with respect to length of the cart 1. The cart 1 can be easily modified between the configurations shown in FIG. 3 and 4 by pressing against opposite ends either toward or away as required from one another so as to apply axial pressure along the longitudinally extending central member 24 and thereby reposition the pin 34 in a desired different aperture 52.

The front and rear lateral support arm carriers 16 and 17 are respectively fastened by gluing or the like to the front side of the bed front member 20 or to the rear side of the rear bed member 21 respectively. The arm carriers 16 and 17 are longitudinally extending tubes which are mirror images of one another and which have on a frontward and rearward facing sides respectively thereof a series of apertures 55 that are spaced therealong.

Received in each of the carriers 16 and 17 are a pair of arms 58 which extend outwardly from the carriers 16 and 17 to the sides. Each of the arms 58 is L-shaped and includes a horizontal section 59 received within the carriers 16 and 17 with a top surface generally planar with the rest of the top surface of the bed 15 and a vertical section 60 which extends above the horizontal section 59. At the top of each vertical section 60 is an eyelet 61. Each of the arms 58 has associated therewith a spring biased pin 34, as seen in FIG. 10, which is positioned so as to be selectively moveable between the various apertures 55 associated with the carrier 16 or 17 that is associated with that particular arm 58. In this manner, the arms 58 may be moved between various configurations wherein the arms 58 are relatively close together, as is shown in solid lines in FIG. 3 or are spaced apart as is shown in phantom lines in FIG. 3. It is apparent the arms 58 can be moved between a variety of different positions and do not require being extended with the same degree of telescoping so as to allow for control of loads that are wider at one end of the cart 1 or the other end, such as is shown in FIG. 4. The arms 58 are adjustable by applying axial pressure either to the left or right, as seen in FIG. 4, to move the arms 58 to the desired position where high vertical portions are desired for the arms 58 (for example, when carrying wood) the sections 59 and 60 can be reversed or arms with longer vertical lengths can be utilized.

The rear carriage 7 comprises a support fork 65, an axle 66 and a pair of ground engaging wheels 67 and 68. The support fork 65 includes a base 70 having a pair of apertures 71 therethrough. The base 70 is secured to the rear laterally extending member 21 so as to depend therefrom by a pair of bolts 73 passing through a pair of apertures 74 in the rear laterally extending member 21 and subsequently through the apertures 71 in the support fork base 70 where upon the bolts 73 are secured by nuts 75.

The support fork 65 includes a pair of depending flanges 77 and 78 having apertures 79 therethrough for receiving the axle 66. The axle 66 extends sidewards approximately equal distances from each of the flanges 77 and 78 and has mounted at opposite ends thereof wheels 67 and 68 such that the wheels 67 and 68 rotate upon the axle 66. The wheels 67 and 68 are spaced from the flanges 77 and 78 by spacers 81 and are maintained on the axle 66 by caps 82 frictionally mounted on the ends of the axle 66. As is best seen in FIG. 5, a support 84 is mounted at one end upon the axle 66 by passage of the axle 66 through an aperture 85 in the support 84 and at an opposite end to the longitudinally extending central member 24. The support 84 is secured to the central member 24 by a pair of ears 86 which are received in apertures 87 in the bottom of the support 84.

The front carriage 6 is quite similar in many respects to the rear carriage 7. In particular, the front carriage 6 includes a support fork 89, an axle 90, a first wheel 91 and a second wheel 92. The support fork 89 includes a pair of flanges 94 and 95 which depend from a base 96 and which have mounted therethrough the axle 90 as has been described above for the rear carriage 7. The base 96 includes an aperture 98 which is centrally located and passes therethrough, as is seen in FIG. 5. The front lateral support arm carrier 16 also includes an aperture 100 passing therethrough which receives a bolt 101 secured by a nut 102 to pivotally connect the front support fork 89 to the lateral support arm carrier 16 to allow relative rotation about a vertical axis. In this manner the support fork 89 can be rotated relative to the load receiving bed 15. Positioned between the support fork 89 and the front lateral support arm carrier 16 is a substantially circular disc 103. The disc 103 has an aperture 104 passing centrally therethrough which allows the bolt 101 to pivotally pass therethrough. The disc 103 extends somewhat rearwardly and sidewardly from the bolt 101 so as to help support the front of the load receiving bed 15 and the front lateral support arm carrier 16 during turning of the cart 1, as will be described below. At the front of the disc 103 is a handle receiving slot 105.

The wheels 91 and 92 are secured to the axle 90 as was described for the rear carriage 7 and are spaced from opposite sides of the support fork 89 by spacers 107.

The draw handle 8 includes inner and outer telescoping elongate members 109 and 110. The distal end of the inner handle member 109 is pivotally secured to a frontward projection 112 of the support fork 89 by a pin 113 passing through an aperture 114 in the handle member 109. When pivoted upwardly, the handle member 109 is also received within the slot 105. At the opposite end of the handle member 110 is a laterally extending hand grip 116 which includes a stub 117 received within the handle member 110 and secured there by a biased pin 34.

Illustrated in FIG. 7 is one of the pins 34 used throughout the invention to selectively secure various parts thereof in a selected position or configuration, but which allow movement of those parts, if so desired, to a new configuration. Each pin 34 includes a spring 120 which biases between opposite sides of a hollow member, here between opposite sides of the intermediate section 50 of the longitudinally extending central member 24. Each pin 24 also includes a nub 121 at one end of the spring 120 which is seated within an aperture 122 in a particular member, such as intermediate section 50 shown in FIG. 7. The opposite end of the spring 120 is a longer pin 124 which is a sufficient length to extend through at least the side of the member, here intermediate section 50, and a second side wall, here rear section 49. In particular, the pin 34 extends through the apertures 52 one at a time in the rear section 49 which is shown in FIG. 7.

Figure 11:
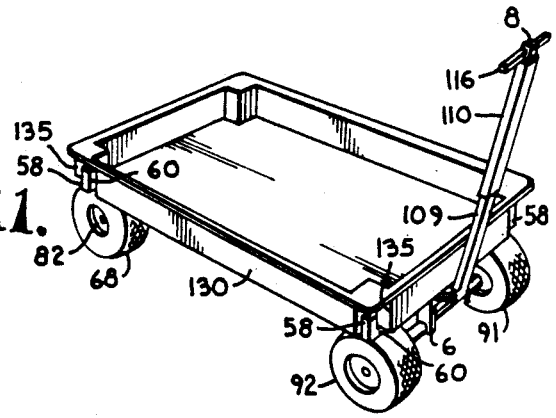
FIG. 11 is a perspective view of the cart in combination with a carrier tray positioned thereon.
Figure 12:
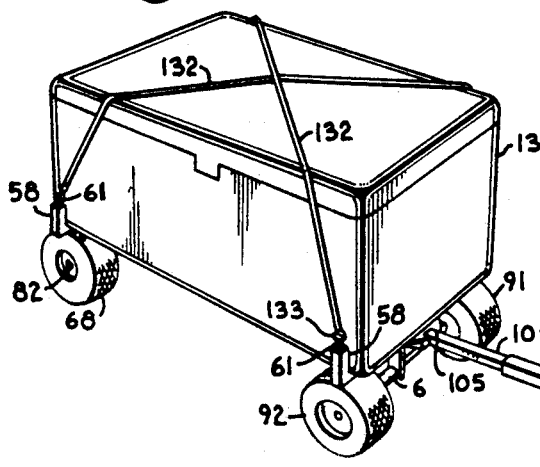
FIG. 12 is a perspective view of the cart with an ice chest positioned thereon and secured by a pair of flexible straps connected to the lateral side arms.
Figure 9:
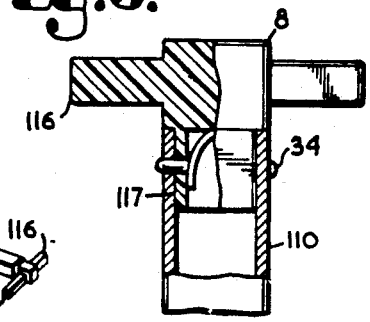
FIG. 9 is an enlarged and fragmentary top plan view of a handle of the cart, with portions broken away to show detail thereof.

Shown in FIG. 11 is a tray 130 mounted on the cart 1 for use in hauling granular material or other small objects on the cart. The tray 130 includes recesses 135 which receive the lateral arm vertical sections 60 to hold the tray 130 on the bed 15. Shown in FIG. 12 is an ice chest 131 mounted on the cart 1 so as to be directly supported by the bed 15 and being secured to the cart 1 by a pair of elastic straps 132 having hooks 133 at opposite ends thereof which are secured in the eyelets 61 of the four side arms 58.

Preferably the cart 1 is entirely constructed of a lightweight but strong and durable plastic except for the axles, fasteners and biasing pins which in combination with the open structure of the bed 15 maintains the weight of the cart 1 at a minimum to allow the cart 1 to be easily picked up and carried, even by someone who is weak or infirm.

It is to be understood that while certain forms of the present invention have been illustrated and described herein it is not to be limited to the specific forms or arrangement of parts described and shown.

What is claimed and desired to be secured by Letters Patent is as follows:

1. A size variable cart comprising:
   (a) a bed for carrying a load, said bed comprising a front lateral member and a rear lateral member; and a pair of longitudinally extending members connected at opposite ends thereof to respective ones of said lateral members; said front and rear lateral members and said longitudinally extending members cooperating to provide a generally planar surface for carrying a load; each of said longitudinally extending members including means for telescoping the ends of said member relative to each other to adjust the length of the respective member and thus adjust the length of said generally planar surface for adapting said cart to loads of various lengths;
   (b) wheel means for supporting and allowing movement of said bed, said wheel means being attached to said bed and including two pairs of wheels, with each of said wheels positioned below said generally planar surface; and
   (c) a pair of lateral side arms connected to one of said lateral members and extending outwardly on opposite sides of said bed; at least one of said side arms including adjustment means for allowing selective adjustment thereof in length relative to said bed to adjust the width of said generally planar surface for adapting said cart to loads of various widths, each of said pair of wheels being connected to a respective one of said front and rear lateral members with a predetermined lateral spacing between the wheels in each pair, said lateral spacing remaining constant as said width of said generally planar surface is varied, whereby said bed is adjustable in length and width proportions while providing a generally planar load carrying surface in any proportion.

2. A cart in accordance with claim 1 wherein:
   (a) said pair of lateral side arms is a front pair of lateral side arms connected to said front lateral member; and including:
   (b) a pair of rear lateral side arms spaced from said front pair of lateral side arms and attached to said rear lateral member.

3. The cart according to claim 2 wherein:
   (a) each of said lateral side arms includes adjustment means to allow independent adjustment of the length of each of said lateral side arms relative to one another and to said bed to thereby adjust the width of said generally planar surface.

4. The cart according to claim 2 wherein:
   (a) each of said lateral side arms includes a L-shaped member attached thereto; said L-shaped member being alignable such that an upright portion thereof extends generally vertically upward relative to said generally planar surface so as to aid in maintaining loads on said bed.

5. The cart according to claim 1 wherein:
   (a) said longitudinally extending members are first and second longitudinally extending members; and including
   (b) a third longitudinally extending member positioned generally intermediate and spaced from said first and second longitudinally extending members, said third longitudinally extending member including opposite ends attached to respective ones of said lateral members and including means for telescoping the ends of said third member relative to each other to adjust the length of the third member and thus adjust the length of said generally planar surface for adapting said cart to loads of various lengths.

6. The cart according to claim 5 wherein:
   (a) said third longitudinally extending member includes position retaining means thereon for holding said third longitudinally extending member in a selected one of a multitude of telescoping configurations thereof.

7. The cart according to claim 6 wherein:
   (a) said position retaining means comprises a spring loaded pin secured to a first section of said third longitudinally extending member and a plurality of apertures for selectively receiving said pin positioned in a second section of said third longitudinally extending member.

8. The cart according to claim 1 wherein:
   (a) said lateral members telescopingly receive said lateral side arms.

9. The cart according to claim 8 wherein:
   (a) each of said lateral side arms includes position retaining means for maintaining said lateral side arm in a selected one of a plurality of lateral configurations thereof.

10. The cart according to claim 1 including:
    (a) a handle for motivating said cart.

11. The cart according to claim 10 wherein:
    (a) said wheel means includes a front carriage having a pair of wheels and support means joining said wheels to said bed such that said wheels are positioned below said generally planar surface and allowing rotation of said wheels; and
    (b) a support disc connected to said support means and said bed; said support disc and said support means being rotatable with said wheels when said front wheels are turned; said support disc having a substantial radius extending perpendicularly outward from a center of rotation of said support means; said support disc being positioned adjacent and beneath said bed so as to help support and stabilize said bed during turning of said front wheels and during shifting of load weight upon said bed.

12. The cart according to claim 11 wherein:
    (a) said support disc includes a slot therein for receiving said handle, said handle being connected to said support means beneath said support disc.

13. A size variable cart comprising:
(a) a bed for carrying a load; said bed including a front lateral member and a rear lateral member, said front and rear lateral members including telescoping means for adjusting the lengths of said front and rear lateral members to adjust the width of said bed; said bed further including a pair of spaced longitudinally extending members connecting said front and rear lateral members; said longitudinally extending members including telescoping means thereon for allowing said members to be telescopingly adjusted to different lengths to allow for receiving loads of various sizes upon said cart; said lateral front and rear members and said longitudinally extending members forming a generally planar upper surface for directly receiving loads thereon; and
(b) front and rear wheel pairs for supporting said bed and allowing movement of said bed, said wheel pairs being attached, respectively, to said front and rear lateral members with a predetermined lateral spacing between the wheels in each pair, said lateral spacing remaining constant as said width of said generally planar surface is adjusted, each of said wheels being positioned beneath the level of said generally planar upper surface such that the entire generally planar upper surface extends above a top level of said wheels.

14. The cart according to cart 13 wherein:
(a) said longitudinally extending members are first and second longitudinally extending member and including a third longitudinally extending member positioned intermediate by and spaced from said first and second longitudinally extending member, said third longitudinally extending member including telescoping means thereon for allowing said third member to be telescopingly adjusted to different lengths to allow for receiving loads of various sizes upon said cart.

15. The cart according to claim 13 wherein:
(a) at least one of said longitudinally extending members includes position retaining means thereon for allowing a selection of one of a plurality of telescopic configurations and maintaining said selected configuration.

16. The cart according to claim 15 wherein:
(a) said position retaining means comprises a biased pin secured to a first section of said longitudinally extending member and a plurality of apertures for selectively receiving said pin in a second section of said longitudinally extending member.

17. A size variable cart comprising:
(a) a bed for carrying a load;
(b) wheel means attached beneath said bed for supporting and allowing movement of said bed;
(c) a pair of lateral side arms attached to said bed and extending outwardly on opposite sides of said bed; said side arms including means for adjusting their length relative to said bed for adapting said cart to loads of various widths; and
(d) said bed including a pair of longitudinally extending members including telescoping means to allow said bed to be adjusted through a plurality of lengths; said bed longitudinally extending members and said lateral side arms having upper surfaces that are generally positioned in a common plane so as to form a generally planar surface, said generally planar surface being positioned above said wheels means to present an unobstructed load supporting surface;
(e), said wheel means comprising two pairs of wheels, each said pair including a predetermined lateral spacing between the wheels in said pair, said lateral spacing remaining constant as said width of said cart is adjusted.

18. A size variable cart comprising:
(a) a bed for carrying a load;
(b) wheel means attached to said bed for supporting and allowing movement of said bed;
(c) said bed including a front lateral member and a rear lateral member; and a pair of longitudinally extending members joining said lateral members;
(d) a pair of lateral side arms attached to one of said front and rear lateral members and extending outwardly on opposite sides of said bed; at least one of said side arms being adjustable in length relative to said one lateral member for adapting said cart to loads of various widths;
(e) a handle for motivating said cart;
(f) said wheel means including a front carriage having a pair of wheels and support means joining said wheels to said bed such that said wheels are positioned below a plane passing through an upper surface of said bed and allowing rotation of said wheels;
(g) a support disc connected to said support means and said bed; said support disc and said support means being rotatable with said wheels when said front wheels are turned; said support disc having a substantial radius extending perpendicularly outward from a center of rotation of said support means; said support disc being positioned adjacent and beneath said bed so as to help support and stabilize said bed during turning of said front wheels and during shifting of load weight upon said bed; and
(h) said support disc including a slot therein for receiving said handle, said handle being connected to said support means beneath said disc.

* * * * *